Figure 1:
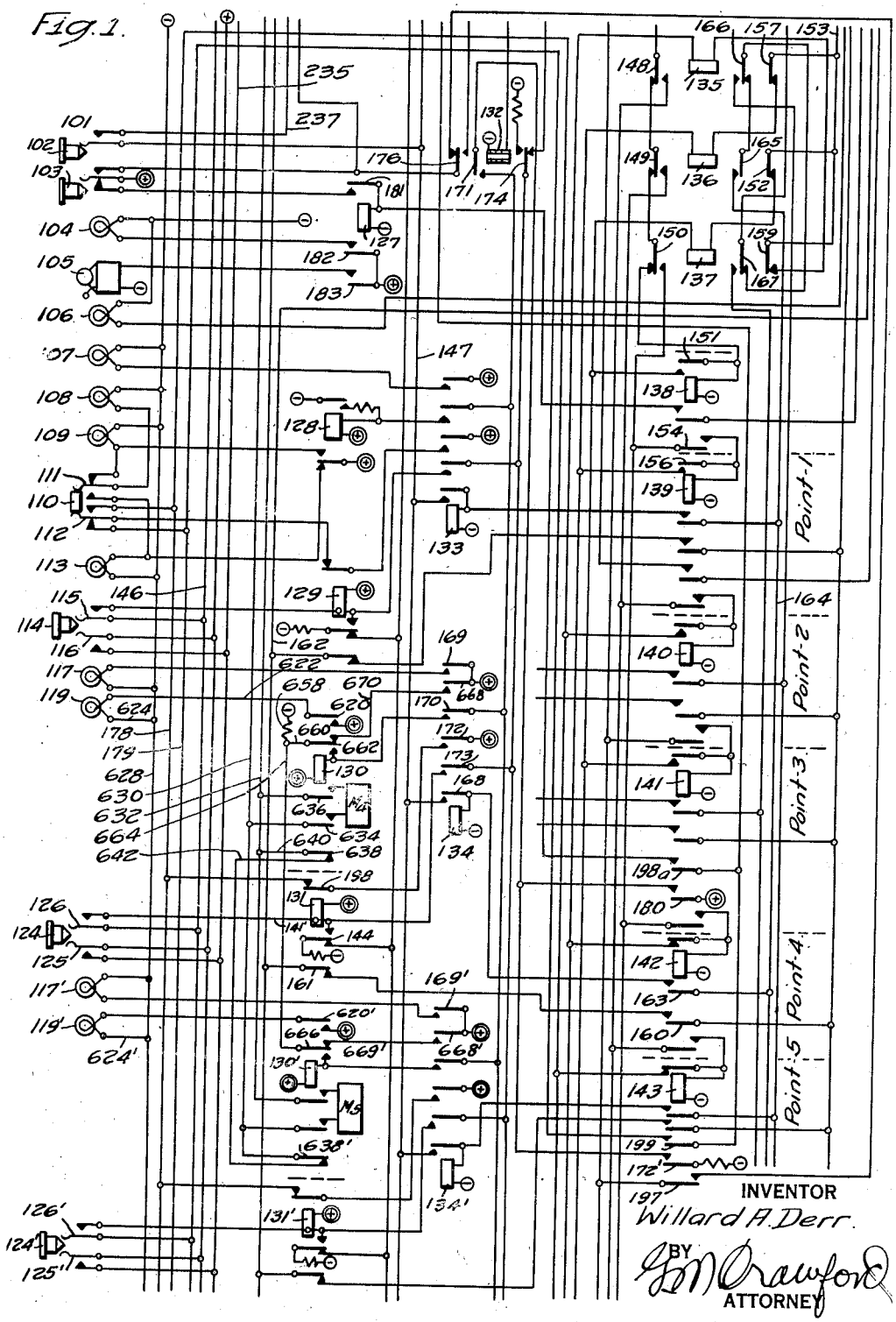

March 23, 1943. W. A. DERR 2,314,692
CONTROL SYSTEM
Filed July 26, 1940 4 Sheets-Sheet 1

INVENTOR
Willard A. Derr.
BY
ATTORNEY

March 23, 1943.  W. A. DERR  2,314,692
CONTROL SYSTEM
Filed July 26, 1940  4 Sheets-Sheet 4

Fig. 4.

INVENTOR
Willard A. Derr.
BY
G. M. Crawford
ATTORNEY

Patented Mar. 23, 1943

2,314,692

UNITED STATES PATENT OFFICE 2,314,692

CONTROL SYSTEM

Willard A. Derr, Wilkinsburg, Pa., assignor to Westinghouse Electric & Manufacturing Company, East Pittsburgh, Pa., a corporation of Pennsylvania Application July 26, 1940, Serial No. 347,626

8 Claims. (Cl. 177—353)

My invention relates, generally, to control systems and, more particularly, to combined supervisory control systems and remote metering systems.

In the operation of remotely disposed substations, power stations, and the like, from a control station, it is common practice to employ a supervisory control system operated over a single signaling channel to selectively control and supervise a plurality of apparatus units at the remote station. Such a supervisory control system is disclosed in the United States patent to Hans P. Boswau No. 2,091,301, issued August 31, 1937. When it is desired to employ such control systems for remote metering in addition to supervisory control functions, systems employed heretofore can be made to function to give remote metering indications in conjunction with supervisory control only by providing an additional metering channel or by interrupting the supervisory control functioning of the system while the metering circuits are operative. Thus continuous metering cannot be obtained by previously known systems without either rendering the supervisory control apparatus inoperative while the metering equipment is functioning or providing a separate metering channel.

An object of my invention is to provide a combined supervisory control system and remote metering system which shall function to provide simultaneous substantially continuous remote metering and supervisory control operations over a single signalling channel.

Another object of the invention is to provide a combined supervisory control system and remote metering system which shall function to provide selective supervisory control operations and substantially continuous selective remote metering operations which shall be interrupted only while supervisory control operations are being performed.

A further object of the invention is to provide a combined supervisory control system and remote metering system employing a single signalling channel which, in addition to supervisory control and metering functions, shall function to give an alarm in the event of line trouble resulting in open-circuiting or short-circuiting the conductors of the signalling channel.

Another object of the invention is to adapt previously known supervisory control systems which employ but a single signalling channel to function as a combined supervisory control system and a substantially continuous selective remote metering system.

Figure 2:
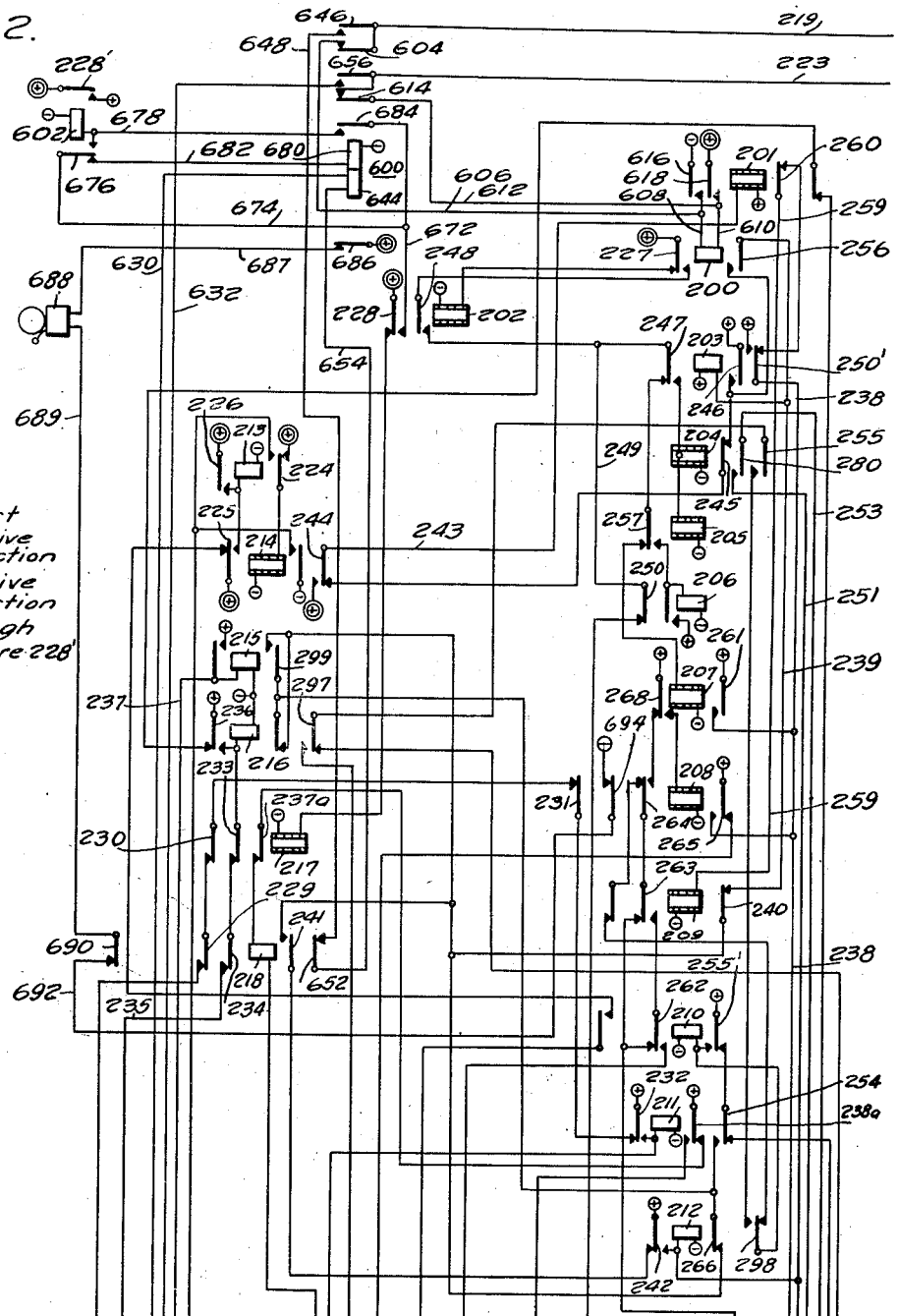
Figure 3:
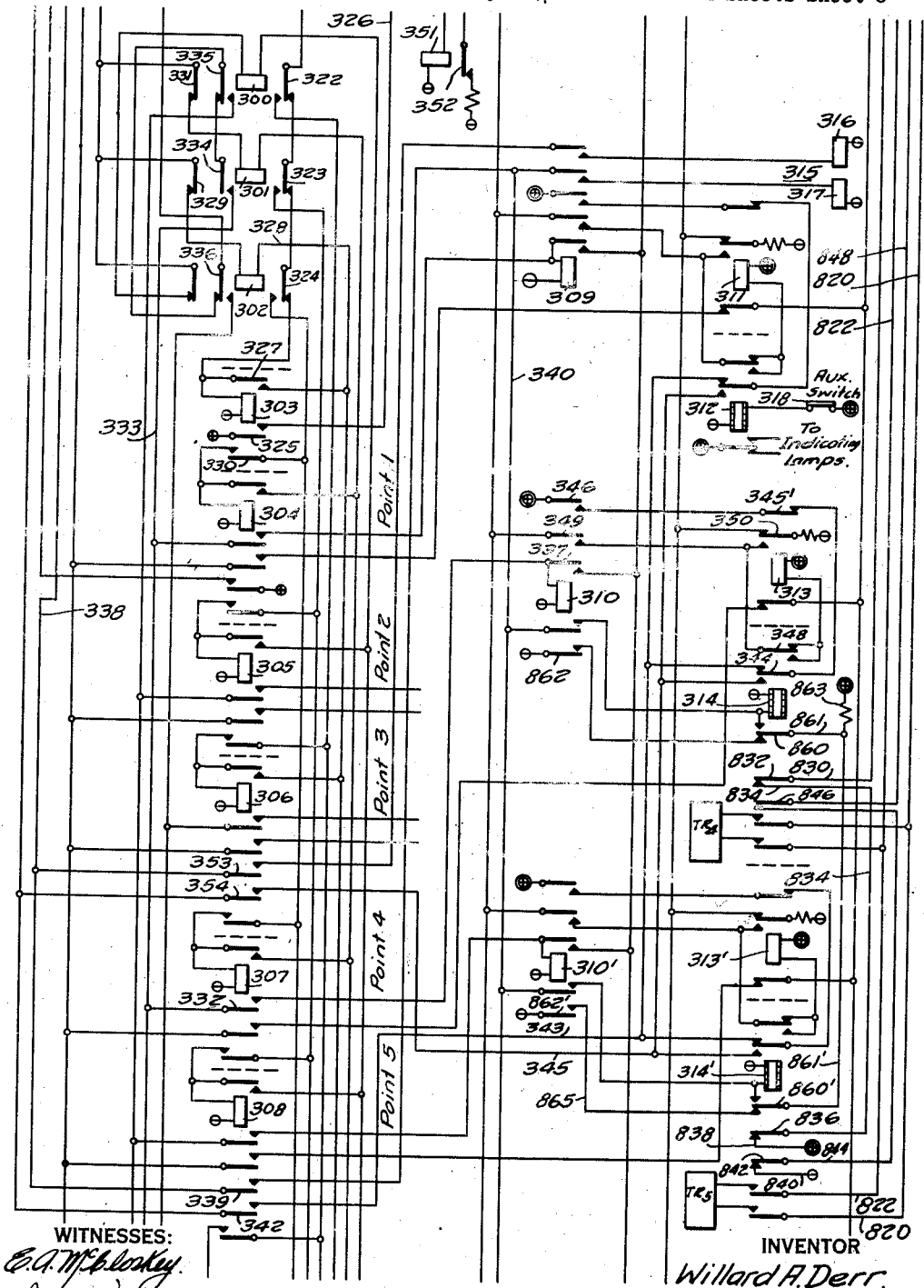

These and other objects and advantages of the invention will be apparent from the following detailed description taken in connection with the accompanying drawings, the four sheets of which, when joined with Fig. 1 below Fig. 2, Fig. 4 to the right of Fig. 2, and Fig. 3 below Fig. 4, form a diagrammatic representation of a combined supervisory control and remote metering system embodying the principal features of my invention.

The preferred embodiment of the invention is shown and described herein as it is applied to the supervisory control system of the hereinbefore referred to Boswau Patent No. 2,091,301, most of the elements of the system of the Boswau patent being shown in the same cooperative relation herein as in the Boswau patent and the elements bearing the same reference characters as in the Boswau patent drawing. Certain relays, conductors and other elements of structure have been omitted and others added, and certain relay contact elements have been added to the relays of the Boswau patent. These elements have been designated by reference characters not found in the Boswau patent.

For convenience of description, to avoid needless repetition, and in order that the invention may be more clearly set forth and understood, reference will be made in this specification to the Boswau Patent No. 2,091,301 for the description of the elements and combinations of elements and their functioning that are common to the two systems and which are fully described in the Boswau patent. In the system of the Boswau patent, the control points comprise individual sets of apparatus which may be selected for operation and thereafter operated or actuated. Thus, for example, the control point associated with a circuit breaker includes the relays and other elements of the supervisory control system which are actuated to select the breaker for operation and to operate the breaker.

In practicing the invention a system is provided for selectively controlling and supervising a plurality of apparatus units such as circuit breakers at a remote station from a control station. The system comprises selective coding and control apparatus operated over a single signalling channel in the form of a single pair of conductors. In addition, the selective coding and control apparatus functions to selectively connect any of a plurality of meters or quantity transmitting devices at the remote station to associated selected meters or receiving devices at the control station. A selected metering circuit remains operative until a different metering circuit is selected and operated to displace it. The selected metering equipment is disconnected while control and supervisory operations are taking place and the metering circuits are reconnected in operative relation when the control and supervisory operations are completed. Thus continuous selective metering is provided except for the short intervals of interruption by control and supervisory operations.

A parallel or multiple type of signalling channel and line relay connection is provided, the line being normally energized through part of the auxiliary metering apparatus and the line pulsing for selective coding comprising alternate energizing and deenergizing of the line and the line relays. The system differs from that of the Boswau patent in this respect, the Boswau system comprising series line relays normally energized and pulsed by alternate break and make of their circuit. Line supervision controlled in part by the auxiliary metering apparatus is included as an important part of the present invention.

For convenience in clearly describing the invention, the system of the Boswau patent has been modified to employ one control point for control and supervisory purposes and two points for selective substantially continuous metering. The master control key, release key, alarm light, alarm bell, and code lamps comprising the elements 101 to 106, the relay and control apparatus associated with the point No. 1 for controlling the circuit breaker 315, and the common controlling, selecting, coding, and auxiliary apparatus at the control station and the remote station are shown identically the same and are designated by the same reference characters as the corresponding apparatus of the Boswau patent, except for the modifications necessary to change the control circuit from the series-circuit type to the parallel-circuit type which will be explained more in detail hereinafter.

Point No. 4 has been adapted for remote metering by eliminating the disagreement lamp, control key, and "open" lamp, and modifying the apparatus and connections associated with point No. 4 at both the control station and the remote station as will be fully described hereinafter. Additional apparatus identical with that associated with point No. 4 has been added and associated with point No. 5 to also adapt it for remote metering.

Thus the system of the Boswau patent has been modified to provide control and supervision of one point of selective control and two selective points of remote metering.

The change from the series type line circuit to the parallel type line circuit has been made by so connecting the line relays 200 and 400, at the control and remote stations respectively, to be normally deenergized and to be energized and deenergized during each coding impulse. This has necessitated reversing the contact elements of the line relays 200 and 400, changing the front contacts to back contacts and the back contacts to front contacts. The line relay 200 is thus connected to the line conductors 219 and 223 through a circuit which extends from the conductor 219 through the back contact element 604 of a metering line relay 600, conductors 606 and 608, the winding of the line relay 200, conductors 610 and 612, and the back contact element 614 of relay 600 to the line conductor 223.

The pulsing of the line at the control station by the pulsing relay 201 is accomplished by the connection of the control station battery to the conductors 608 and 610 by the front contact elements 616 and 618 of the relay 201.

Similarly, the line relay 400 at the remote station is connected to the line conductors 219 and 223 through a circuit which extends from the conductor 219 through the back contact element 804 of a metering line relay 800, the conductors 806 and 808, the winding of the line relay 400, the conductors 810 and 812 and the back contact element 814 of the relay 800 to the conductor 223.

The pulsing of the line from the remote station by the pulsing relay 401 is accomplished by the connection of the remote station battery to the conductors 808 and 810 by the front contact elements 816 and 818 of the relay 401.

The supervisory relay 130 associated with the point No. 4 controls an indicating lamp 119, which indicates that the point No. 4 is connected for remote metering, through a circuit which extends from positive battery through a contact element 620 of the relay 130, conductor 622, the lamp 119, and conductors 624 and 626 to negative battery. A similar indicating circuit for the lamp 119' for point No. 5 is controlled by the supervisory receiving relay 130'.

A check indicating lamp 117 is controlled by the contact element 169 of the point selecting relay 134, as described in the hereinbefore referred to Boswau Patent No. 2,091,301, and a similar indicating lamp 117' is provided for point No. 5.

The supervisory receiving relay 130 is disposed to connect an associated meter M4 across conductors 630 and 632 through their contact elements 634 and 636, and the supervisory receiving relay 130' is similarly disposed to connect its associated meter M5 across the conductors 630 and 632. Another shunting circuit controlled by the back contact elements 638 and 638' of the relays 130 and 130' extends from the conductor 632 through a conductor 640, the contact element 638, a conductor 642, and the contact element 638' to the conductor 630.

At the remote station the code control operating relays 310 and 310' are selectively operable by the selecting system, and they in turn control the energization of their associated relays 314 and 314', respectively. The relays 314 and 314' function to connect their associated metering transmitters TR4 and TR5, respectively, to conductors 820 and 822. By these circuits, the potential of the selected metering transmitter is applied to the conductors 820 and 822. Potential may also be applied to the conductors 820 and 822 from the station battery in a circuit which extends from the conductor 820 through a front contact element 824 of the relay 800, a conductor 826, a back contact element 828 of the relay 417, a conductor 830, a back contact element 832 of the relay 314, a conductor 834, a back contact element 836 of the relay 314', a conductor 838, positive battery, negative battery, a conductor 840, a back contact element 842 of the relay 314', a conductor 844, a back contact element 846 of the relay 314, a conductor 848 and a front contact element 850 of the relay 800. The energizing circuit comprising the conductors 820 and 822 and the alternative sources of potential connected thereto may be connected to the line conductors 219 and 223 through a circuit which extends from the line conductor 219 through a conductor 852, a front contact element 854 of the relay 800, a conductor 856, the holding winding 858 of the relay 800, the conductor 822, the alternative energizing means connected to the conductors 822 and 820, and the conductor 820 to the conductor 223.

The conductors 630 and 632 form part of a holding circuit for a holding winding 644 of the metering line relay 600 which extends from the line conductor 219 through the front contact element 646 of the relay 600, a conductor 648, a back contact element 652 of the start relay 218, a conductor 654, the holding winding 644 of the relay 600, the conductor 630, one of the shunting circuits comprising one of the meters M4 and M5 or the shunting contact elements 638 and 638', the conductor 632 and the front contact element 656 of the relay 600 to the line conductor 223.

Thus an energized holding circuit is provided for the holding coils 644 and 858 of the metering line relays 600 and 800. In the normal operation of the system, this holding circuit operates to maintain the metering line relays 600 and 800 in energized position.

Electrical interlock circuits are provided for disconnecting a connected metering point and associated apparatus, and connecting the other metering point and associated apparatus when the other metering point is selected. At the control station, a holding circuit for the relay 130 extends from negative battery through a current limiting resistor 658, a conductor 660, a contact armature 662 of the relay 130 and its front contact element and the winding of the relay 130 to positive battery. A similar holding circuit for the relay 130' extends from negative battery through the resistor 658, a conductor 664, a contact armature 666 of the relay 130' and its associated front contact element and the winding of the relay 130' to positive battery. When relay 130' of metering point No. 5 is held energized over its holding circuit, and metering point No. 4 is selected for connection to the metering circuit, a front contact element 668 of the point selecting relay 134 will close a shunting circuit for the relay 130' which extends from positive battery, through the front contact element 668, a conductor 670, a back contact element and the contact armature 662 and the conductor 660 to the resistor 658. This circuit will shunt the winding of relay 130' and cause it to break its holding circuit. Similarly, a contact element 668' of the relay 134' will control a shunting circuit to break the holding circuit of the relay 130.

At the remote station, holding circuits are provided for the relays 314 and 314' which function to connect the selected metering transmitter to the metering circuit. Contact armatures 860 and 860' cooperate with their front contact elements to complete holding circuits for their respective relays, and in conjunction with the contact elements 862 and 862' of the relays 310 and 310', respectively, and their own back contact elements provide shunting circuits as described hereinbefore in connection with the corresponding relays 130 and 130' at the control station.

An auxiliary reset relay 602 is provided at the control station for maintaining the positive connection through its armature 228' which is maintained by the armature 228 of the reset relay 202 of the Boswau Patent No. 2,091,301. Similarly, an auxiliary reset relay 802 is provided at the remote station for maintaining the positive connection through its armature 421'.

When a selective control operation takes place on the system, the holding circuit for the metering line relays 600 and 800 is interrupted by the actuation of back contact element 652 of the starting relay 218 if the operation is initiated from the control station, and by the actuation of the back contact element 826 of the relay 417 at the remote station which is controlled by the individual equipment of the apparatus units at the substation. It is necessary, therefore, to re-energize and restore the holding circuit of the metering line relays 600 and 800 after each selective control operation, and this function is performed by the auxiliary reset relay 602 at the control station and relay 802 at the remote station in cooperation with the metering line relays 600 and 800 and the reset relays 202 and 402 and their associated circuits.

When the reset impulse is applied at the end of each control or supervisory operation as fully explained in the Boswau Patent No. 2,091,301, the reset relay 202 is deenergized sufficiently long to permit its contact armatures to drop to break a holding circuit for the relay 602, which extends from positive battery through the contact armature 228 of the relay 202 and its associated front contact element, conductors 672 and 674, a contact armature 676 of the relay 602 and its associated front contact element, a conductor 678 and the winding of the relay 602 to negative battery. When the reset relay 202 again picks up at the end of the reset impulse, an energizing circuit is established for the actuating winding 680 of the relay 600 extending from positive battery through the contact armature 228 and its front contact element, the conductors 672 and 674, the contact armature armature 676 and its back contact element, a conductor 682 and the actuating winding 680 to negative battery. The actuation of the relay 600 completes an energizing circuit for the relay 602 extending from positive battery through contact armature 228 and its associated front contact element, the conductor 672, contact element 684 of the relay 600, the conductor 678, and the winding of the relay 602 to negative battery. The energization of the relay 602 causes it to complete its own holding circuit through its contact armature 676, and the energizing circuit of the relay 600 is broken by the actuation of the contact armature 676 of the relay 602.

The reset relay 402, the auxiliary reset relay 802 and the metering line relay 800 at the remote station are all interconnected in the manner described in connection with the corresponding relays 202, 602 and 600 at the control station and function to reenergize the relay 800 and reestablish its holding circuit. These reset functions occur substantially simultaneously at the control and remote stations, and the metering line relays are reenergized at the same time.

The holding circuit, which is also the metering circuit and which is established by the simultaneous energization of the metering circuit relays 600 and 800, includes alternatively the station battery at the remote station if no metering point is selected, or the selected metering transmitter from which the conductors 820 and 822 are energized as hereinbefore described, and extends from the conductor 820, through the conductor 223, the contact element 656 of the relay 600, the conductor 632, alternatively a selected meter M4 or M5 or, if no metering point is selected, the shunting circuit including the armatures 638 and 638', the conductor 630, the holding winding 644 of the relay 600, the conductor 654, the contact element 652 of the relay 218, the conductor 648, the contact element 646 of the relay 600, the line conductor 219, the conductor 852, the armature 854 of the relay 800, the conductor 856, the holding winding 858 of the relay 800 to the conductor 822.

An alarm circuit is provided for indicating line trouble resulting in an open-circuit or a short-circuit of the line conductors 219 and 223. This alarm circuit extends from positive battery through a back contact element 686 of the metering line relay 600, a conductor 687, an alarm device 688, a conductor 689, a back contact element 690 of the relay 218, a conductor 692, and a back contact element 694 of the relay 208 to negative battery.

*Operation*

As has been explained hereinbefore, the invention is shown and described herein as an adaptation of the system of the Boswau Patent No. 2,091,301, and reference is made to the Boswau patent for the complete description of the elements of the system and the functioning and cooperative relationship of the elements of the system which are not set forth in detail here.

In the operation of the system, when it is desired to select and operate the point No. 4, the operator will actuate the point operate by 124 momentarily, which will energize the starting relay 131 and, in conjunction with the coding, selecting and control apparatus, will select and operate the individual point relay 310 at the remote station, as explained in the Boswau patent. Following the operation of the relay 310, checking impulses are sent back to the control station to select and operate the point selecting relay 134 which is individual to the No. 4 point. The actuation of the relay 134 will energize the check lamp 117 through the contact element 169 of the relay 134, indicating that the selected metering point has been selected and prepared for operation.

The master control key 101 is next operated to cause the selecting, coding, and control apparatus at the control station and the remote station to energize the relay 314 to connect the metering transmitter TR4 to the line as described hereinbefore. The actuation of the relay 314 will cause an indicating code of impulses to be sent to the control station to actuate the supervisory receiving relay 130. The supervisory receiving relay 130 will connect the meter M4 to the metering circuit and will cause the lamp 119 to be energized to indicate that the metering circuit is connected for operation.

As described hereinbefore, the sending of the selecting and control codes from the control station energizes the relay 218 to break the holding circuit for the metering line relays 600 and 800, causing these relays to drop. After the completion of the control operations, however, the reset relays 202 and 402 will release, and, operating in conjunction with the auxiliary reset relays 602 and 802, will reenergize and restore the holding circuit for the relays 600 and 800 to thus complete the metering circuit with the selected metering transmitter TR4 and meter M4 connected in cooperative relation over the line conductors in series circuit relation with the holding coils 644 and 858 of the relays 600 and 800, respectively.

If now it is desired to operate the circuit breaker 315 associated with the No. 1 point, the regular operating procedure described in the Patent No. 2,091,301 may be carried out. Upon the initiation of control impulses, the holding circuit for the relays 600 and 800 will be opened, and these relays will be dropped to connect the line relays 200 and 400 to the line conductors 219 and 223 to respond to the coded impulses. After the control operation, the reset relays 202 and 402 will function in cooperation with the auxiliary reset relays 602 and 802 to restore the holding circuit for the metering line relays 600 and 800 and reconnect the metering transmitter TR4 and the meter M4 in cooperative relation. Thus continuous metering is provided except for the short interval required for the control and supervisory operations which were necessary to the selective control of the circuit breaker 315.

If now it is desired to provide a metering indication or operation of the metering point No. 5, the operator at the control station will actuate the point operate key 124' momentarily and the coding selecting and control system will open the holding circuit for the metering relays 600 and 800 at the back contact elements 652 of the relay 218, and will select and operate the individual point relay 310' associated with the No. 5 point at the remote station. The operation of the relay 310' at the remote station will close a shunting circuit for the coil of the relay 314 which is energized over a holding circuit which includes the contact armature 860 of the relay 314 and its associated front contact element, a conductor 861 and a resistor 863. The shunting circuit closed by the relay 310' extends from negative battery through the contact element 862' of the relay 310', a conductor 865, the contact armature 860' of the relay 314' and its associated back contact element and a conductor 861' to the resistor 863. The closure of this shunting circuit will cause the relay 314 to drop, thereby disconnecting the metering transmitter TR4 from the metering circuit.

Following the operation of the relay 310', checking impulses are sent back to the control station to select and operate the point selecting relay 134' which is individual to the No. 5 point. The actuation of the relay 134' will energize the check lamp 117' through the contact element 169' of the relay 134' indicating that the selected metering point No. 5 has been selected and prepared for operation.

The energization of relay 134' also completes a shunting circuit for the winding of the relay 130 which, as hereinbefore described, is held energized over its own holding circuit. This shunting circuit extends from positive battery through the contact element 668' of the relay 134', a conductor 669, contact armature 666 of the relay 130' and its associated back contact element and the conductor 664 to the resistor 658. The deenergization of the relay 130 causes the meter M4 to be disconnected from the metering circuit.

The control station operator next actuates the master control key 101 to cause the selecting, coding and control apparatus at the control station and the remote station to energize the relay 314' at the remote station to connect the metering transmitter TR5 to the line as described hereinbefore. The actuation of the relay 314' will cause an indicating code of impulses to be sent to the control station to actuate the supervisory receiving relay 130'. The actuation of the relay 130' will connect the meter M5 to the metering circuit, will cause the lamp 119' to be energized to indicate that the metering circuit for point No. 5 is connected for operation, and will complete its own holding circuit through its contact armature 666.

After the selecting and control operations, the reset impulse will be automatically applied as explained in the Boswau Patent No. 2,091,301, and the metering circuit relays 600 and 800 will again be energized and will complete the holding circuit which includes the relays 600 and 800, the meter M5, the metering transmitter TR5 and the line conductors 219 and 223 in series circuit relation.

In the event that an operation occurs at the remote station such as the automatic tripping of the circuit breaker 315, the metering circuit will be interrupted at the contact element 828 of the relay 417 when the operation signal code is transmitted from the remote station to the control station, thus opening the holding circuit of the metering line relays 600 and 800. The metering circuit will be completed again, however, by the automatic reset impulse after the control operations have been completed as explained hereinbefore.

When it is desired to have neither of the metering points connected for operation, the point operate key for the metering point which is not selected and operating is actuated. This releases the connected meter and metering transmitter as hereinbefore described. The reset key 103 is next actuated to apply the reset impulse to the line relays 200 and 400 which will reset the apparatus and reconnect the metering line relays 600 and 800 to restore the closed energized metering circuit with the remote station battery supplying the energization for the metering circuit through the back contact elements 836 and 842 of the relay 314' at the remote station.

The line supervision alarm circuit described hereinbefore will function whenever the metering line relay 600 is deenergized, except when relay 600 is deenergized due to the transmission of control coding impulses from the control station when the contact armature 699 of the relay 218 will be opened to open the line alarm circuit, or when relay 600 is deenergized due to the opening of the metering circuit at the contact element 828 of the relay 417 caused by the starting of code impulsing from the remote station, in which event the contact 694 of the relay 208 at the control station will open the alarm circuit when coding impulses are received from the remote station. When relay 600 is deenergized due to an open-circuit or a short-circuit on the line conductors, the contact elements 694 and 699 of relays 208 and 218, respectively, remain closed and the contact element 686 of the relay 600 completes the energizing circuit for the alarm device 688.

The metering transmitters TR4 and TR5 may be any well known means for applying a potential to the metering circuit in accordance with the measured quantity at the remote station, and the meters M4 and M5 at the control station may be any electrically responsive device capable of indicating or recording the desired values in accordance with the potentials applied to the metering circuit.

While the embodiment of the invention disclosed herein comprises only one operating point and two metering points, it is to be understood that as many operating points and as many metering points as desired may be controlled in accordance with the principles of the invention.

It will be seen that I have provided a combined supervisory control system and remote metering system which shall function to provide selective supervisory control and substantially continuous selective remote metering which shall be interrupted only while supervisory control operations are being performed, and which, in addition to supervisory control and metering functions, shall function to give an alarm in the event of line trouble resulting in open-circuiting or short-circuiting the conductors of the control channel.

In compliance with the requirements of the patent statutes, I have shown and described herein a preferred embodiment of my invention. It is to be understood, however, that the invention is not limited to the precise construction shown and described, but is capable of modification by one skilled in the art, the embodiment herein shown being merely illustrative of the principles of my invention.

I claim as my invention:

1. In a supervisory control system having a signalling channel extending between a control station and a remote station, a plurality of control points at the remote station and corresponding control points at the control station, and means at the control and remote stations for selectively operating the corresponding pairs of control points over the signalling channel, in combination, means associated with certain of the control points for giving a continuous indication at the control station of a condition at the remote station by continuous energization of the signalling channel, and means responsive to the control operations for other control points while the said indication is being given for interrupting the said continuous indication only while the control operations for the said other control points are taking place.

2. In a supervisory control system having a signalling channel extending between a control station and a remote station, a plurality of control points at the remote station and corresponding control points at the control station, and means at the control and remote stations for selectively operating the corresponding pairs of control points over the signalling channel, in combination, metering transmitting means at the remote station associated with certain of the control points and metering receiving means associated with the corresponding control points at the control station, means responsive to the selective operation of the metering points for connecting the metering transmitting and receiving means associated with the selected point in a metering circuit energized by the selected metering transmitter and including the said signalling channel, and means responsive to the operation of other of the control points while the metering means is connected to the signalling circuit for interrupting the selected metering circuit only while the operation of said other control points is taking place.

3. In a supervisory control system having a signalling channel extending between a control station and a remote station, a plurality of control points at the remote station and means at the control and remote stations for selectively operating the points at the remote station over the signalling channel, in combination, metering transmitting means at the remote station associated with certain of the control points and metering receiving means at the control station, means responsive to the selective operation of the metering points for connecting the metering transmitting means associated with the selected point and the metering receiving means at the control station in a metering circuit continuously energized by the selected metering transmitter and including the said signalling channel, and means responsive to operation of the control points other than the metering points while the metering means are connected to the signalling channel for interrupting the selected metering circuit only while the said other control points are being operated.

4. In a supervisory control system having a signalling channel extending between a control station and a remote station, a plurality of metering transmitters at the remote station and a plurality of associated metering receivers at the control station, an apparatus unit at the remote station, relay means at said control and remote stations operative over the signalling channel for selectively preparing the associated metering transmitters and receivers for connection in a metering circuit including the signalling channel and for controlling said apparatus unit over the signalling channel, said relay means comprising means responsive to the starting of any connecting or controlling operation for disconnecting any previously connected metering transmitter and receiver from the metering circuit, means responsive to the completion of a selective preparing operation for connecting the newly selected associated metering transmitter and receiver to the metering circuit, and means responsive to the completion of a control operation for re-connecting the previously connected associated metering transmitter and receiver to the metering circuit.

5. In a supervisory control system having a signalling channel extending between a control station and a remote station, a plurality of metering transmitters at the remote station and a plurality of associated metering receivers at the control station, a plurality of apparatus units at the remote station, relay means at the control and remote stations operative over the signalling channel for selectively preparing the associated metering transmitters and receivers for connection in a metering circuit including the signalling channel and for selectively controlling said apparatus units over the signalling channel, said relay means comprising means responsive to the starting of any connecting or controlling operation for disconnecting any previously connected metering transmitter and receiver from the metering circuit, means responsive to the completion of a selective preparing operation for connecting the newly selected associated metering transmitter and receiver to the metering circuit, and means responsive to the completion of any selective control operation for re-connecting the previously connected associated metering transmitter and receiver to the metering circuit.

6. In a supervisory control system comprising a plurality of control points at a control station, a plurality of corresponding control points at a remote station and coding, selecting, and control relay means at said stations operable over a signalling circuit to select and operate the control points, in combination, a metering transmitter associated with each of certain of the control points at the remote station and metering receivers associated with the corresponding points at the signalling station, controllable apparatus units associated with other of the points at the remote station, operating means for each of the remote points, means whereby operation of any remote metering point causes the metering transmitter associated with that point to be prepared for connection in a metering circuit, means controlled from the control station and including said relay means for selecting for operation any desired one of the remote metering points, means at the remote station responsive to the selection of any metering point for rendering the operating means for the other metering points inoperative, means including said relay means responsive to the selection for operation of a remote metering point for preparing the associated metering receiver at the control station for connection in a metering circuit and for rendering the metering receivers of the other points inoperative to be connected in a metering circuit, control means at the control station including said relay means for actuating the selected operating means at the remote station, means including said relay means responsive to the operation of the selected point at the remote station for causing the selected metering receiver to be connected in the metering circuit and for completing a metering circuit including the signalling circuit and the selected metering receivers and transmitters, and means responsive to the control operations for the apparatus units for disconnecting any previously selected metering transmitter and receiver only while said control operations for the apparatus units are taking place.

7. In a supervisory control system having a signalling channel extending between a control station and a remote station, a plurality of control points at the remote station and a plurality of corresponding control points at the control station, and coding, selecting and control relay means at the stations operable over the signalling channel to select and operate the control points, a metering transmitter associated with each of the remote control points and a metering receiver associated with each of the control points at the control station, means controlled from the control station and including said relay means for selecting for connection to a metering circuit a metering receiver and its associated metering transmitter, means operable from the control station and including said relay means for connecting said selected metering receiver and transmitter in a metering circuit including said signalling channel, an apparatus unit at the remote station, means controlled from the control station and including said relay means for controlling said apparatus unit over said signalling channel, means for automatically interrupting said selected metering circuit when the control operations for said apparatus unit are begun, and means for automatically re-connecting the selected metering circuit when the control operations for said apparatus unit are completed.

8. In a supervisory control system having a signalling channel extending between a control station and a remote station, a plurality of control points at the remote station and a plurality of corresponding control points at the control station, and coding, selecting and control relay means at the stations operable over the signalling channel to select and operate the control points, a metering transmitter associated with each of the remote control points and a metering receiver associated with each of the control points at the control station, means controlled from the control station and including said relay means for selecting for connection to a metering circuit a metering receiver and its associated metering transmitter, means operable from the control station and including said relay means for connecting said selected metering receiver and transmitter in a metering circuit including said signalling channel, an apparatus unit at the remote station, means including said relay means associated with one of the control points other than those with which the metering apparatus is associated for controlling and supervising said apparatus unit, and means for interrupting said metering circuit only during the control and supervisory operations.

WILLARD A. DERR.